Patented Dec. 14, 1948

2,456,297

UNITED STATES PATENT OFFICE 2,456,297

PROTEIN HYDROLYSIS

Daniel Melnick, Kew Gardens Hills, N. Y., assignor, by mesne assignments, to Food Research Laboratories, Inc., a corporation of New York No Drawing. Application October 28, 1943, Serial No. 508,056

4 Claims. (Cl. 99—21)

This invention relates to protein hydrolysates and in particular is directed to a novel process for carrying out the hydrolysis and the product resulting therefrom.

Investigations during recent years have revealed that the character of the amino acid composition of protein mixtures is of utmost importance in determining the nutritional values of protein-containing foods. If the selection of foods is restricted because of economic limitations or conditions due to a general emergency (blockade, rationing, etc.), care must be exercised in the proper choice of protein. The two chief considerations in this matter are the essential amino acid composition and the digestibility of the protein mixture.

Generally speaking, the amino acids may be utilized in one of three chemical processes in the organism: (a) Condensation with other amino acids to form proteins characteristic of a particular tissue; (b) Utilization of the amino acids for some special purpose other than general synthesis of cellular protein (e. g., synthesis of the blood proteins, of the protein moiety of enzyme, of the protein with hormonal function, etc.); and (c) Deamination of the amino acid and utilization of the non-nitrogenous portion for caloric purposes. The essential amino acids are of particular importance in the first two categories. If protein constitutes an unusually large fraction of the diet, the excess amino acids, both essential and non-essential, are utilized for caloric purposes.

For the amino acids to be utilized in any of the above mentioned chemical processes it is essential that the protein furnishing these amino acids be digestible. Thus, the proteins known as the keratins, found in hair, skin, hoofs, horn, and other materials of such character, are so resistant to enzymic digestion in vivo that they fail to yield the amino acids obtainable therefrom by strong acid or alkali hydrolysis. Even in the case of the soy bean proteins, now coming into prominence as an important item in the American dietary, the essential amino acids known to be present are poorly utilized because of the resistance of the proteins to digestion. Only by subjecting the soy bean meal to moist heat at super atmospheric pressure can the proteins be converted into a form readily digestible by the animal organism. Protein hydrolysates, including those prepared by enzymic action (provided in the latter, completion of the hydrolysis is approached), directly furnish the organism with protein in predigested form.

The value of dietary proteins may be determined by nitrogen balance studies. Thus, when the dietary protein intake is inadequate, quantitatively or qualitatively (i. e., furnishing insignificant quantities of the essential amino acids), the nitrogen excreted is in excess of that ingested. This condition of negative nitrogen balance represents a loss of tissue protein from the organism. When the reverse is true, such as is observed in the growing child or in the pregnant woman, evidence of tissue protein synthesis is apparent from the positive nitrogen balance. In the case of the normal well-nourished adult, the nitrogen intake is equal to that excreted. Such an individual is said to be in nitrogen equilibrium. When an excess of protein is ingested by such an individual, nitrogen equilibirum is soon reestablished, but at a higher level of excretion. The reason therefor is the inability of the animal organism to store an appreciable quantity of protein or amino acids. The excess protein is metabolized solely for caloric purposes. Through nitrogen balance studies, it is therefore possible to ascertain the essentiality of amino acids for nutritional purposes.

It has been found that even though the amount of protein ingested may exceed the minimal protein requirement of man, hypoproteinemia and edema may occur. Such conditions are therefore attributed to an insufficient supply of essential amino acids to the organism.

Closely related to nutritional edema are the conditions of lowered assimilative ability on the part of the body or of protein wastage caused by infections or intoxications.

It has been reported that optimal growth could be induced in rats fed a diet furnishing only the ten essential amino acids. A recent application of the observation that an adequate mixture of the amino acids may replace protein in nutrition has been the clinical use of protein hydrolysates. These preparations have been administered orally and parenterally.

Such hydrolysates are economically preferable to the crystalline essential amino acids. The latter are either difficult to prepare from their natural sources or are synthesized only at a prohibitive cost. Furthermore, the synthetic amino acids are usually mixtures of equal parts of the d- and l-forms. In the case of valine, leucine, isoleucine, lysine and threonine, only the natural isomers promote growth. For this reason crystalline amino acids have been used only in studies of an experimental nature. For practical purposes, protein hydrolysates prepared by acid or enzymic digestion must be employed.

Serious objections to acid hydrolysis of proteins reside in the need to use special equipment which is not attacked by the strong acid at the high temperatures required for the protein cleavage. Furthermore, the refluxing operations and repeated vacuum distillations if hydrochloric acid is chosen for hydrolysis, or the laborious time-consuming centrifugations (of barium sulfate) if sulfuric acid is selected, are costly procedures. In addition, acid hydrolysis destroys tryptophane, one of the essential amino acids (see e. g., Kemmerer, U. S. P. 2,180,637). It is also to be noted that acid hydrolysis results in the partial racemization of the amino acids.

Alkali hydrolysis of proteins is also subject to objections since it causes complete racemization of the amino acids. Furthermore, the alkali process results in the decomposition of cystine and conversion of arginine into ornithine (a non-essential amino acid) and ammonia.

The objection to racemization is due to the fact that in the case of at least five of the essential amino acids, the unnatural isomers are not biologically active.

Therefore, enzymic hydrolysis, if it can be effective in hydrolyzing the protein, is regarded as the most satisfactory of the known methods for obtaining the amino acids from proteins. Indeed, workers in this art have recognized that such should be the case, and have expressed regret that it had not yet been possible to obtain a complete hydrolysis of proteins with any of the well known enzymes (see, e.g., Sahyun, U. S. P. 2,241,927).

One of the problems encountered in the past when working with enzyme preparations arose from the need to use comparatively huge quantities of the enzyme materials in order to effectuate a significant hydrolysis of the proteins in the starting materials. As a consequence, the use of such large quantities of the enzyme materials yielded products containing very substantial amounts (as much as 50 per cent) of hydrolysates derived from the enzyme preparations themselves. Protein hydrolysates of this character should therefore, strictly speaking, be called mixtures of hydrolysates derived from the starting materials and the enzyme digestants rather than hydrolysates of the basic proteins. This would be apparent if the commercial protein hydrolysates had been subjected to analyses for their essential amino acid composition, since these acids serve to identify the sources from which they have been derived.

In the enzyme hydrolysis of proteins it has also been considered necessary for the preparation of pure hydrolysates to start with highly purified protein materials. For example, Kemmerer (U. S. P.'s 2,180,636/7) describes how carefully he purifies his casein before it is subjected to actual hydrolysis.

Heat coagulation of protein has frequently been employed as a means for separating the protein from other constituents in a mixture such as carbohydrate, fat and salts. However, with respect to highly purified hemoglobin, the principal protein of blood, it has been reported that heat coagulation reduces its susceptibility to hydrolysis by highly purified enzyme preparations.

I have discovered that I can achieve almost complete hydrolysis of the proteins contained in the starting materials by first coagulating the proteins and using an unusually small amount of an enzyme preparation, e.g., from one-fifth to one-tenth of the quantity of enzyme material heretofore regarded as minimal for this purpose; that there are only small losses of the amino acids present in the total proteins subjected to hydrolysis; that, of the total protein initially present (starting material and enzyme preparation), 85 to 90 per cent are converted to amino acids; and that, of the total amino acids present in the final hydrolysate, 90 to 95 per cent are derived from the starting material and 5 to 10 per cent from the enzyme preparation. The hydrolysate contains no residual protein or proteoses, and but a slight amount of peptones and peptides. The material is predominantly a mixture of free amino acids.

In general the present invention involves:

(a) The heat coagulation of the proteins in materials such as blood, e.g., bovine blood;

(b) The use generally of a small single charge of an effective stable proteolytic enzyme allowing maximal hydrolysis per unit of enzyme;

(c) Digestion of the coagulated protein at a pH of 8.0–8.5 in the presence of an effective bacteriostatic agent which allows prolonged digestion with respect to time and with no fear of bacterial contamination;

(d) Recovery of the hydrolyzed proteins from the solution, free from contaminants such as pigments, pyrogens, and undesirable flavors;

(e) The dehydration (in vacuo) of the hydrolyzed proteins to a palatable white powder containing the known essential amino acides in biologically active form (not having undergone racemization) in substantial quantities and in proportions which parallel to a remarkable extent the recommended daily intake suggested for man by Block, Yale J. Biol. Med., 15, 723 (1943).

Accordingly, among the objects of this invention, are:

1. To render whole blood protein more susceptible to enzymic digestion by preliminary heat coagulation.

2. By enzymic digestion to produce a protein hydrolysate containing an unusually and unexpectedly large percentage of the substrate proteins in the form of free amino acids.

3. By enzymic digestion to produce a protein hydrolysate containing an unusually small percentage of the amino acids derived from the enzyme preparation used for the hydrolysis.

4. To effectuate an almost complete hydrolysis of protein through enzymic digestion to yield all the known essential amino acids in substantial quantities and in proportions which parallel to a remarkable extent the recommended daily intake for the human.

5. By enzymic digestion to produce a protein hydrolysate free from contaminants such as pigments, pyrogens and undesirable flavors.

6. To achieve the foregoing by a method more economical than was heretofore possible through the use, generally, of a small single charge of an effective stable proteolytic enzyme.

7. To provide clinicians, dietitians and others with an improved concentrate of the essential amino acids, derived from protein materials, satisfactory for oral or parenteral administration.

The following illustrates an example of the process for carrying out the invention:

Into 4 liters of beef blood contained in a glass lined tank, as open steam line was inserted and the blood proteins coagulated as the temperature of the mixture rose. Steam was passed through the suspension until the temperature reached at least 90° C. One liter of distilled water was added to break up the protein coagulum. Live steam was passed through the suspension for an additional hour. At the end of this period the total volume was made up to 16 liters representing a four-fold dilution of the original blood. By controlling the temperature of the water added for the dilution, the temperature of the final mixture is reduced to 35°–40° C. The mixture was then saturated with toluene to render it bacteriostatic, and a small layer of toluene floated on the surface in order to form a barrier to bacterial invasion. (Chloroform or independent additions of chloroform and toluene also proved to be satisfactory bacteriostatic agents. Reduction of the surface area of the material undergoing hydrolysis by the use of appropriately constructed tanks makes it possible to use a small quantity of toluene for the barrier layer.) The pH of the mixture was then adjusted with concentrated sodium hydroxide to about 8.5. A sample was taken from the batch for formol titrations to obtain the initial value (zero time hydrolysis). The formol titrations were determined in accordance with a modification of the technic developed by Sorensen and Henriques, now known as Sorensen's formol titration method. Since the pigmentation in these solutions was so intense that it was impossible to estimate, by visual or photoelectric colorimetry, when end-points had been reached, electrometric titrations were carried out.

Eighty grams of pancreatin (technical grade, supplied by The Wilson Laboratories, division of Wilson & Co., Chicago, Ill.) suspended in 200 cc. of water were added, the mixture stirred thoroughly and a small sample removed for bacterial count. The mixture was then placed in a room at 37° C. and the pH of the hydrolysate readjusted daily to 8.0–8.5.

By conducting formol titrations on the initial mixture (a), on the samples removed periodically during the course of the hydrolysis (b) and on an aliquot subjected to complete hydrolysis by boiling acid (9N $H_2SO_4$ under refluxing for a period of 24 hours) (c), it is possible to calculate the degree of enzymic protein hydrolysis at any given time according to the formula.

$$\frac{b-a}{c-a} \times 100 = \text{per cent hydrolysis of protein}$$

The formol titration values indicated, according to the above procedure, that there was a prompt conversion of protein to amino acids within the first 24 hours of incubation, a subsequent tapering off in the rate of hydrolysis and finally at the end of the 7th to 8th day a cessation of enzymic activity. The values indicated an 85 per cent hydrolysis of the proteins to have occurred. (In some cases when only a 75 to 20 per cent hydrolysis is achieved by this process, it has been found possible to boost the hydrolysis to the desired 85 to 90 per cent figure by the addition of a supplemental one-half charge of the enzyme preparation.)

Bacteriological counts of the hydrolysate made after 0, 4 and 8 days of hydrolysis showed that the batch had become sterile; the counts decreasing from 20,000 microorganisms to 0 per cc.

On completion of the hydrolysis at the end of the 8th day the pH of the batch was adjusted to 4.5, the immiscible bacteriostatic agent removed, and the suspension heated for 10 minutes at 80–90° C. to inactivate the enzyme. The flocculent insoluble material which contains no nitrogen was removed by centrifugation. (It is possible to allow the hydrolysate to stand in large tall cylinders containing the same bacteriostatic agent used during hydrolysis and allow the insolubles to settle out. The clear supernatant liquid may then be removed by siphoning and the sludge centrifuged. The insoluble material should receive at least one washing with hot water (1/20 volume). If centrifugation is not practical economically, the sludge may be resuspended in added water, and the mixture allowed to stand until the insoluble material settles and the clear supernatant again removed. Repetition of this operation effects a good degree of separation of the amino acids solution from the insoluble residue.)

The amino acid solutions and washings were then pooled and subjected to charcoal decolorization (Animal Charcoal, No. 8 Powder, supplied by the American Agricultural Chemical Co., New York, N. Y.). Seventy grams of the animal charcoal were suspended in 100 cc. of water and filtered with suction through a coarse filter paper in a Buchner funnel. This filter pad (about 5 millimeters in depth) was washed a number of times to remove the smaller charcoal particles; the washings were discarded. The hot amino acid solution was then poured by an indirect stream on to the charcoal filter. The material filtered at an extremely rapid rate and was well decolorized. As the filtration proceeded, the degree of decolorization progressively decreased. Seventy grams of the charcoal were sufficient to clarify satisfactorily 4 liters of the original amino acid hydrolysate (equivalent to 1 liter of whole blood). The filtration of 4 liters of hydrolysate was completed within a 15-minute period. The filter, after being washed with 200 cc. hot water, was discarded because the amino acid filtrate had become progressively darker and not because the filtration had slowed down to an impractical rate. (If the final commercial product is to be marketed as a deeply pigmented syrup, the charcoal decolorization need not be so extensive.)

The filtrate, still at pH 4.5 was then concentrated in vacuo to dryness. During the course of the concentration the tyrosine precipitated first (amino acid concentration 15–20 per cent), followed by cystine and then by the other amino acids. The final product was a light amber (almost white) fluffy powder and contained 11.8 per cent N on the dry basis. It contained 81.2 per cent amino acids, 12.2 per cent ash, 5.0 per cent moisture, 1.2 per cent carbohydrate and 0.4 per cent fat.

If the material is to be used as a solution of the amino acids, 15–20 per cent, it may be desirable to remove, by filtration, the precipitate of tyrosine. This amino acid is regarded as a substitute, under certain conditions, for phenylalanine, and the concentration of the latter in the hydrolysate is ample. The filtrate, after removal of the tyrosine, may be sterilized by autoclaving it at 15 pounds pressure for 0.5 hour. To 19 parts of the sterile solution are added 1 part of 95 per cent ethanol containing 2 per cent benzoic acid. The reaction of the amino acid solution (pH 4.5), the presence of 5 per cent ethanol and 0.1 per cent benzoic acid all operate to maintain sterility.

The conception of carrying out an effective hydrolysis of protein within a reasonable period of time by first subjecting it to heat coagulation and then digesting the coagulum with a single charge of an unusually small amount of enzyme material was confirmed by a series of experiments which are presented in the two following tables. All the tests were conducted with whole beef blood using pancreatin as the sole proteolytic enzyme preparation.

*Effect of preliminary heat coagulation of the proteins of beef blood [1] upon the rate and degree of pancreatic hydrolysis at 37° C. and pH 8*

| Experiment | | Extent of protein hydrolysis during successive days of incubation | | | | |
|---|---|---|---|---|---|---|
| Quantity of enzyme added | State of protein | 0 | 1 | 2 | 3 | 4 |
| Grams [2] | | Per cent | Per cent | Per cent | Per cent | Per cent |
| 40 | Native | 0 | 56 | 82 | 84 | 88 |
| 40 | Heat coagulated | 0 | 63 | 86 | 83 | 92 |
| 20 | Native | 0 | 40 | 46 | 59 | 73 |
| 20 | Heat coagulated | 0 | 60 | 79 | 79 | 82 |
| 10 | Native | 0 | 9 | 16 | 22 | 32 |
| 10 | Heat coagulated | 0 | 49 | 68 | 72 | 79 |
| 5 | Native | 0 | 4 | 8 | 12 | 16 |
| 5 | Heat coagulated | 0 | 31 | 47 | 52 | 60 |

[1] The whole blood samples (one liter in each case) were diluted 1 to 4 (1+3) with distilled water prior to the enzymic hydrolysis.
[2] Single addition of the enzyme at the beginning of the incubation period.

*Comparison of single with fractional additions of pancreatin upon the rate and degree of enzymic digestion of heat coagulated proteins of beef blood [1] at 37° C. and pH 8*

| Enzyme Added | | Extent of protein hydrolysis during successive days of incubation | | | | | |
|---|---|---|---|---|---|---|---|
| Total | Procedure | 0 | 1 | 2 | 3 | 4 | 5 |
| Grams | | Per cent | Per cent | Per cent | Per cent | Per cent | Per cent |
| 40 | Single addition | 0 | 63 | 86 | 83 | 92 | 94 |
| 40 | Five daily additions of 8 gm | 0 | 30 | 53 | 62 | 73 | 78 |
| 20 | Single addition | 0 | 60 | 79 | 79 | 82 | 85 |
| 20 | Five daily additions of 4 gm | 0 | 25 | 47 | 53 | 66 | 74 |
| 10 | Single addition | 0 | 49 | 68 | 72 | 79 | 82 |
| 10 | Five daily additions of 2 gm | 0 | 12 | 39 | 51 | 58 | 68 |
| 5 | Single addition | 0 | 30 | 47 | 52 | 60 | 68 |
| 5 | Five daily additions of 1 gm | 0 | 12 | 34 | 44 | 52 | 62 |

[1] The whole beef blood samples (one liter in each case) were diluted 1 to 4 (1+3) with distilled water prior to the enzymic hydrolysis.

As an index of the quality of the final product the following table is presented listing the essential amino acid composition of the whole beef blood hydrolysate.

| Amino Acid | Content | | |
|---|---|---|---|
| | On dry basis [1] | Calculated to 16.0% nitrogen [2] | Calculated to 13.8% nitrogen [3] |
| | per cent | per cent | per cent |
| Arginine | 3.2 | 4.3 | 3.7 |
| Cystine [4] | 0.6 | 0.8 | 0.7 |
| Histidine | 3.2 | 4.3 | 3.7 |
| Isoleucine | 0.4 | 0.5 | 0.4 |
| Leucine | 6.7 | 9.1 | 7.8 |
| Lysine | 6.3 | 8.5 | 7.4 |
| Methionine | 2.0 | 2.7 | 2.3 |
| Phenylalanine | 5.1 | 6.9 | 6.0 |
| Threonine | 5.0 | 6.8 | 5.8 |
| Tryptophane | 0.8 | 1.0 | 0.9 |
| Tyrosine [4] | 0.8 | 1.0 | 0.9 |
| Valine | 8.8 | 11.9 | 10.3 |
| Total essential amino acids | 42.9 | 57.8 | 49.9 |

[1] Of the total solids 85.5 per cent were amino acids.
[2] 16.0 per cent is the nitrogen content of most pure proteins. The values in this column give the yield of the various amino acids from the total proteins of the blood and enzyme preparation.
[3] 13.8 per cent is the calculated nitrogen content of the amino acids derived from the total proteins of the blood and enzyme preparation. The values in this column indicate the essential amino acid composition of the hydrolyzed protein mixture after processing.
[4] Cystine and tyrosine are not in the true sense essential amino acids; however, since there are suggestions that they may substitute for methionine and phenylalanine, respectively, they are included in the above list.

The unique character of the product prepared in accordance with this invention is discussed in detail in a forthcoming paper (Melnick, D., J. Am. Dietet. Assoc., Nov. 1943). In that paper there is presented a comparison of the essential amino acid content of the hydrolysate herein described with those of excellent sources of dietary proteins. In addition, the effectiveness of the hydrolysate for parenteral protein alimentation is also evaluated in comparison with potential hydrolysates derived from the other proteins of high nutritional quality.

I claim:

1. Process of hydrolyzing blood proteins which consists in: heat coagulation of the proteins; and the digestion thereof with a small single charge of a pancreatic enzyme preparation whereby approximately 85% of the proteins are converted to amino acids, and not more than 10% of the free amino acids in the final hydrolysate are derived from the pancreatic enzyme preparation.

2. Process of producing a protein hydrolysate which comprises: the heat coagulation of the protein in 1 part of bovine blood; the dilution of the coagulum with approximately 3 parts of water; and the digestion of the diluted coagulum with a single charge of approximately 0.02 part of a pancreatic enzyme preparation to yield approximately 85% conversion of the protein to amino acids.

3. Process of producing a protein hydrolysate which comprises: the heat coagulation of the protein in 1 part of bovine blood; the dilution of the coagulum with approximately 3 parts of water; and the digestion of the diluted coagulum at a pH of approximately 8.0–8.5 with a single charge of approximately 0.02 part of a pancreatic enzyme preparation to yield approximately 85% conversion of protein to amino acids.

4. Process of producing a protein hydrolysate which comprises: the heat coagulation of the protein in 1 part of bovine blood; the dilution of the coagulum with approximately 3 parts of water; and digestion of the diluted coagulum at a pH of approximately 8.0–8.5 in the presence of a bacteriostatic agent, with a single charge of approximately 0.2 part of a pancreatic enzyme preparation to yield approximately 85% conversion of protein to amino acids.

DANIEL MELNICK.

REFERENCES CITED

The following references are of record in the file of this patent:

UNITED STATES PATENTS

| Number | Name | Date |
| --- | --- | --- |
| 1,254,033 | Eberle | Jan. 22, 1918 |
| 2,180,637 | Kemmerer | Nov. 21, 1939 |
| 2,241,927 | Sahyun | May 13, 1941 |
| 2,316,733 | Weizmann | Apr. 13, 1943 |
| 2,364,008 | Stuart | Nov. 28, 1944 |

FOREIGN PATENTS

| Number | Country | Date |
| --- | --- | --- |
| 208,144 | Great Britain | 1925 |

OTHER REFERENCES

Winton, Structure and Composition of Food, vol. III, page 350, John Wiley & Sons, 1937.